US 6,701,804 B2

(12) United States Patent
Terada

(10) Patent No.: US 6,701,804 B2
(45) Date of Patent: Mar. 9, 2004

(54) POWER SWITCHING APPARATUS

(75) Inventor: Eiichi Terada, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/242,909

(22) Filed: Sep. 13, 2002

(65) Prior Publication Data

US 2003/0177861 A1 Sep. 25, 2003

(30) Foreign Application Priority Data

Mar. 25, 2002 (JP) .................................. 2002-084297

(51) Int. Cl.⁷ .......................... F16H 48/16; B60K 23/04
(52) U.S. Cl. ........................... 74/650; 192/35; 192/50; 180/249
(58) Field of Search ................. 74/650; 180/249; 192/35, 38, 50, 105 B

(56) References Cited

U.S. PATENT DOCUMENTS

| 4,285,422 A | * | 8/1981 | Bentley ................. 192/105 B |
| 4,597,467 A | * | 7/1986 | Stockton .................... 74/650 |
| 4,981,192 A | * | 1/1991 | Kurihara et al. ............. 74/650 |
| 5,348,126 A | * | 9/1994 | Gao .......................... 192/35 |
| 5,464,084 A | * | 11/1995 | Aoki et al. .................. 192/35 |
| 5,577,423 A | * | 11/1996 | Mimura ....................... 74/650 |
| 5,904,073 A | * | 5/1999 | Mimura ....................... 74/650 |
| 5,971,123 A | * | 10/1999 | Ochab et al. ................. 192/50 |
| 6,463,830 B1 | * | 10/2002 | Ito et al. .................... 74/650 |
| 2003/0178237 A1 | * | 9/2003 | Terada ....................... 180/249 |

FOREIGN PATENT DOCUMENTS

| JP | 2000326748 | 11/2000 |
| JP | 200180385 | 3/2001 |

* cited by examiner

*Primary Examiner*—Richard M. Lorence
*Assistant Examiner*—Dennis Abdelnour
(74) *Attorney, Agent, or Firm*—Orum & Roth

(57) ABSTRACT

In a power switching apparatus which switches a power transmitting state from a drive member to left and right two driven members, a circumferential connection surface of the drive member and each of circumferential connection surfaces in both of the driven members are wedge connected according to an interposition of rolling elements by moving cages in an axial direction based on a centrifugal force of a switching means. The power switching apparatus also brings end surfaces of the cages into frictional contact with the driven members so as to rotate together therewith.

3 Claims, 5 Drawing Sheets

2

POWER SWITCHING APPARATUS

BACKGROUND OF THE INVENTION

1. Field of the Invention

The present invention relates to a power switching apparatus which is preferable for switching a two-wheel drive state and a four-wheel drive state, in a vehicle.

2. Description of the Related Art

In power switching apparatuses for a vehicle, as described in Japanese Patent Application Laid-Open No. 2001-80385 (JP-A), there are structures having the following features. A differential transmits rotation of a drive shaft to a wheel pair. A first rotary member corresponds to an output member of the differential in a side of one wheel, and a second rotary member is arranged to be relatively rotatable to the first rotary member and which integrally rotates with one wheel. A third rotary member integrally rotates with a case of the differential rotating in correspondence to the rotation of the drive shaft. A dog clutch can be switched among a first position at which a connection between the first rotary member and the second rotary member is cancelled, a second position at which the first rotary member and the second rotary member are connected, and a third position at which the first rotary member, the second rotary member and the third member are connected.

In the prior art, a two-wheel drive state in which rear wheels are only driven may be established, during which time the dog clutch is at the first position. A differential free state (a four-wheel drive state capable of absorbing rotation difference between right and left front wheels during a vehicle turning operation) in which four wheels are driven is established when the dog clutch is at the second position. A differential lock state (a direct-connection four-wheel drive state capable of integrally rotating the right and left front wheels so as to improve traveling characteristics) in which four wheels are driven may be established when the dog clutch is at the third position.

In the conventional power switching apparatus, the differential mechanism for switching the two-wheel drive state, the four-wheel drive differential free state and the four-wheel drive differential lock state involves installation of a bevel gear. Therefore, the structure becomes complex and large in size.

Further, since the switching operation is executed by using the dog clutch, it is necessary to align phases for engagement and disengagement of a sleeve and a spline which constitute the dog clutch.

SUMMARY OF THE INVENTION

An object of the present invention is to easily switch between a complete two-wheel drive state and a complete four-wheel drive state based on a compact and simple structure. In this case, the complete two-wheel drive state means a state in which only two front wheels or only two rear wheels are driven. The complete four-wheel drive state means a state in which the two front wheels and the two rear wheels are driven, and the right and left wheels are driven based on the integral rotation.

According to the present invention, there is disclosed a power switching apparatus for switching a power transmitting state from a drive member to right and left two driven member, comprising the following structure.

A circumferential connection surface is provided in a drive member. Circumferential connection surfaces are provided in both of the driven members. The circumferential connection surface of the drive member and the circumferential connection surfaces of the driven members are coaxially arranged inside and outside.

An annular space forms a wedge-like gap in a peripheral direction between the circumferential connection surface of the drive member and the circumferential connection surfaces of both of the driven members in a repeated manner.

A cage is received in the annular space, and a plurality of rolling elements are held at a plurality of positions in a peripheral direction of the cage.

An energizing member brings each of the rolling elements into contact with the circumferential connection surfaces in the drive means and one of the driven members, and energizes each of the rolling elements in a direction in which the rolling elements are not in contact with the circumferential connection surfaces in the drive member and another of the driven members.

A switching means moves the cage in an axial direction due to a centrifugal force, brings an end surface of the cage into frictional contact with the drive member and another of the driven member so as to rotate together therewith, and wedge connects the circumferential connection surface of the drive member and each of the circumferential connection surfaces in both of the driven members according to an interposition of the rolling elements.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
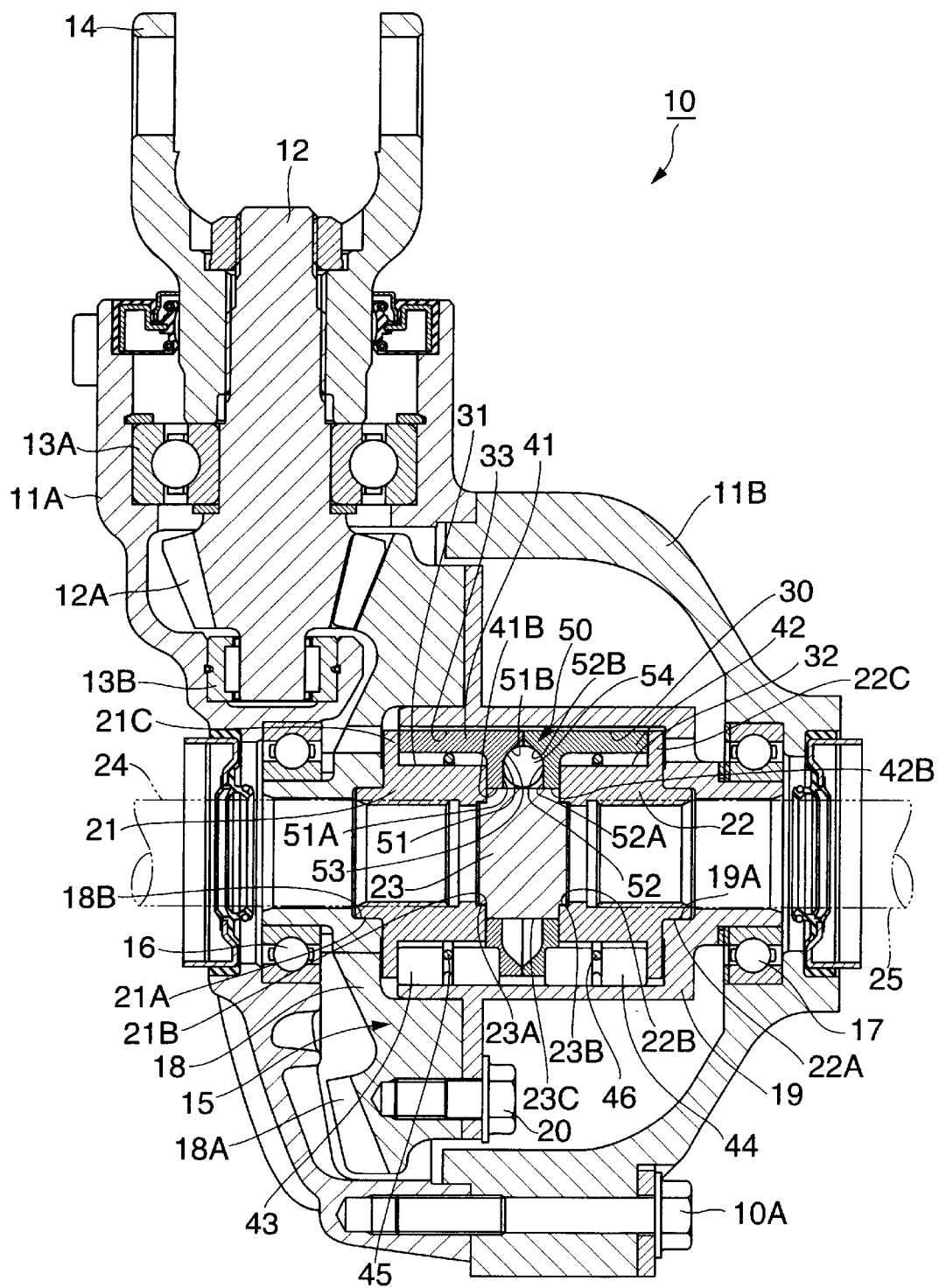
FIG. 1 is a cross sectional view which shows a power switching apparatus.

According to the invention, a vehicle to which the present invention is applied is structured such that a transmission is connected to an output side of an engine. A drive shaft is connected to an output side of the transmission. Right and left rear wheel sets are connected to an end of the drive shaft in a side of the rear wheels via a differential, and right and left front wheel sets are connected to an end of the drive shaft in a side of the front wheels via a power switching apparatus 10. In this vehicle, an engine rotating force which is transmitted to the differential of the rear wheels from the drive shaft is always transmitted to the rear wheels, and a rotating force which is transmitted to the power switching apparatus 10 in the side of the front wheels from the drive shaft is transmitted to the right and left front wheels according to a switching operation of the power switching apparatus 10. When the power switching apparatus 10 is in an off mode in which the power switching apparatus 10 does not transmit the rotating force to the right and left front wheels, the vehicle operates in a complete two-wheel drive state in which the vehicle is driven only by two rear wheels. When the power switching apparatus 10 is in an on mode in which the power switching apparatus 10 transmits the rotating force to the right and left front wheels, the vehicle operates in a complete four-wheel drive state in which the vehicle is directly driven by two front wheels and is driven by two rear wheels.

The power transmitting apparatus 10 is, as shown in FIG. 1 to FIG. 6, such that first and second housings 11A and 11B are integrally connected by a bolt 10A. A pinion gear shaft 12 provided with a pinion gear 12A is supported to the housing 11A via bearings 13A and 13B. A yoke 14 is fixed to the pinion gear shaft 12 according to a spline connection, and the drive shaft mentioned above is connected to the yoke 14.

A drive member 15 is supported to the housing 11A and the housing 11B via bearings 16 and 17. The drive member 15 corresponds to an assembled body, in which a ring gear shaft 18 which is provided with a ring gear 18A, and a case 19, are integrally connected by a bolt 20. The ring gear 18A is engaged with the pinion gear 12A. Accordingly, the drive member 15 is always driven by a rotation of the drive shaft.

Two left and right driven members 21 and 22 and a spacer 23 held between the driven members 21 and 22 are arranged between end surfaces which are opposed to each other on a center axis of the ring gear shaft 18 and the case 19 constituting the drive member 15. A left front wheel set 24 is fixed to the driven member 21 through a spline connection, and a right front wheel set 25 is fixed to the driven member 22 through a spline connection.

At this time, the drive member 15, both of the driven members 21 and 22 and the spacer 23 are coaxially arranged with each other. A step-like outer peripheral portion 21A which is provided on an outward end surface of the driven member 21 in a protruding manner is coaxially fitted to a step-like inner diameter portion 18B which is provided on a punched end surface of the ring gear shaft 18 in a recess manner, so as to be capable of relatively rotating. The outward end surface of the driven member 21 can be abutted against the punched end surface of the ring gear shaft 18 in an axial direction thereof. A step-like outer peripheral portion 22A which is provided on an outward end surface of the driven member 22 in a protruding manner is coaxially fitted to a step-like inner diameter portion 19A which is provided on a punched end surface of the case 19 in a recess manner, so as to be capable of relatively rotating. The outward end surface of the driven member 22 can be abutted against the punched end surface of the case 19 in an axial direction thereof. Further, step-like outer diameter portions 23A and 23B which are respectively provided on both side end surfaces of the spacer 23 in a protruding manner are coaxially fitted to step-like inner peripheral portions 21B and 22B which are provided on a punched end surface of the driven member 21 and the driven member 22 in a recess manner, respectively. The respective side end surfaces of the spacer 23 can be abutted against the respective punched end surfaces of the driven member 21 and the driven member 22 in an axial direction thereof. Accordingly, both of the driven members 21 and 22 and the spacer 23 are held in the drive member 15 (the ring gear shaft 18 and the case 19) in a state in which they can relatively rotate. The drive member 15 (the ring gear shaft 18 and the case 19), both of the driven members 21 and 22 and the spacer 23 are coaxially arranged in a state in which they are coaxially fitted to each other.

Figure 2:
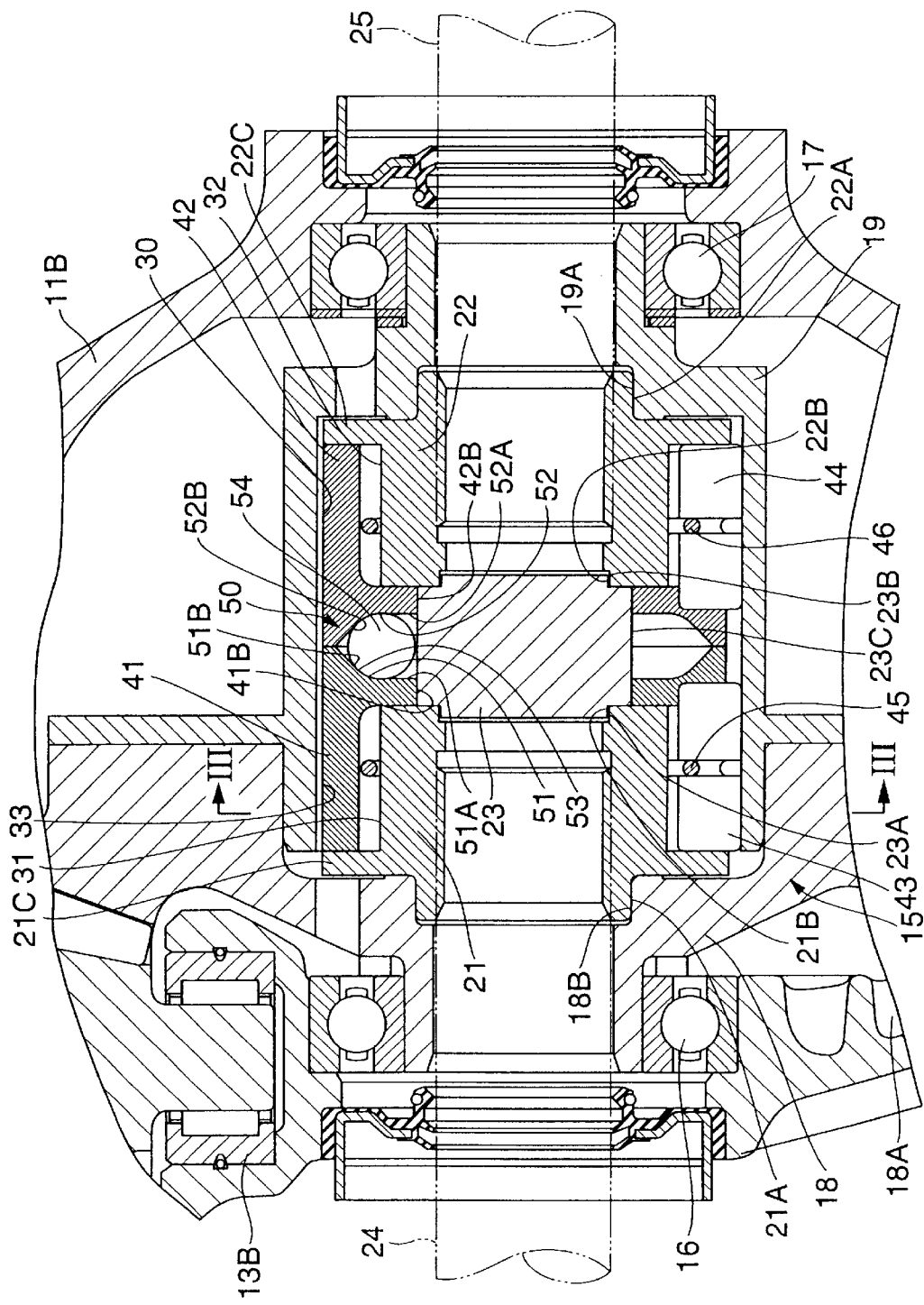
FIG. 2 is an enlarged view of a main portion in FIG. 1.
Figure 3:
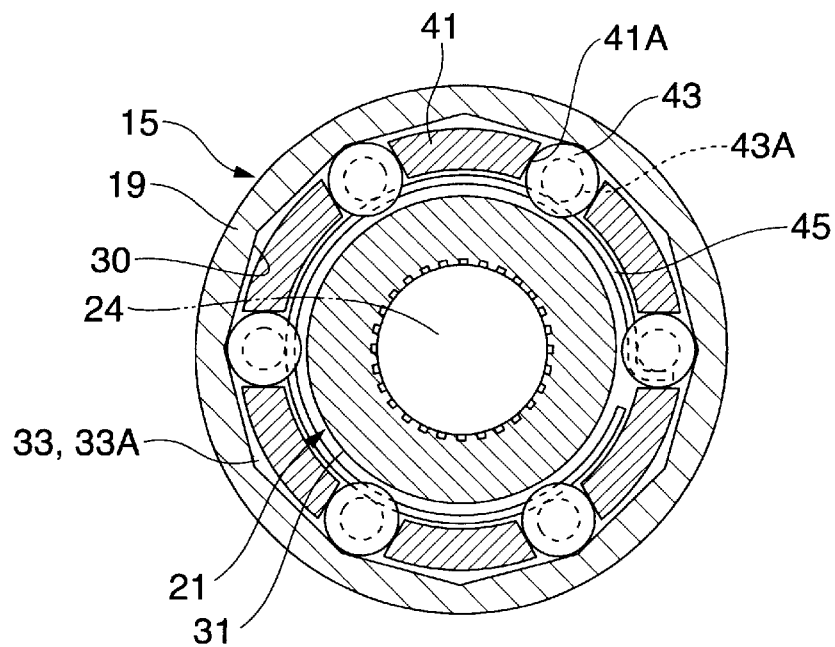
FIG. 3 is a cross sectional view along a line III—III in FIG. 2, and shows a non-wedge connection state.

Further, in the power switching apparatus 10, a circumferential connection surface 30 which is provided on an inner diameter surface of the case 19 constituting the drive member 15, and circumferential connection surfaces 31 and 32 which are provided on outer diameter surfaces of both of the driven members 21 and 22 are coaxially arranged inside and outside, respectively, as shown in FIGS. 2 and 3. The circumferential connection surface 30 of the case 19 is formed in a polygonal shape. A wedge-like gap 33A is formed in which both sides (a forward rotating direction and a backward rotating direction) in a circumferential direction are narrow, in an annular space 33 between the circumferential connection surface 30 of the case 19 and the circumferential connection surfaces 31 and 32 of both of the driven members 21 and 22, in a repeated manner.

Further, the power switching apparatus 10 receives cages 41 and 42 respectively corresponding to both of the driven members 21 and 22 in the annular gap 33 between the drive member 15 (the case 19) and both of the driven members 21 and 22. The power switching apparatus 10 holds roller-like rolling elements 43 and 44 in pockets 41A and 42A which are provided at a plurality of positions in a peripheral direction of the respective cages 41 and 42, thereby constituting a roller clutch mechanism according to the following manner.

The power switching apparatus 10 is provided with annular grooves 43A and 44A in center portions of the respective rolling elements 43 and 44. A ring-like energizing member 45 which is provided in the periphery of the driven member 21 is engaged with and attached to the groove 43A of each of the rolling elements 43. The power switching apparatus 10 is provided with a ring-like energizing member 46 which is provided in the periphery of the driven member 22 and is engaged with and attached to the groove 44a of each of the rolling bodies 44. The energizing member 45 is engaged with and attached to the grooves 43A of all the rolling elements 43 which are adjacent in the peripheral direction from the side of the driven member 21, in a state in which one end bent portion is engaged with the groove 43A of one rolling element 43. The energizing member 45 energizes each of the rolling elements 43 in such a manner as to be in contact with the maximum inner diameter portion of the circumferential connection surface 30 in the case 19. The rolling element 43 is in non-contact with the circumferential connection surface 31 of the driven member 21, and is held in a neutral position. Accordingly, the energizing member 45 forms a racing state in which the drive member 15 (the case 19) and the driven member 21 are not engaged (FIG. 3). The energizing member 46 is engaged with and attached to the grooves 44A of all the rolling elements 44 which are adjacent in the peripheral direction from the side of the driven member 22, in a state in which one end bent portion is engaged with the groove 44A of one rolling element 44. The energizing member 46 energizes each of the rolling elements 44, so as to be in contact with the maximum inner diameter portion of the circumferential connection surface 30 in the case 19. The rolling element 43 is in non-contact with the circumferential connection surface 32 of the driven member 22, and is held in a neutral position. Accordingly, the energizing member 46 forms a racing state in which the drive member 15 (the case 19) and the driven member 22 are not engaged (the same as FIG. 3).

The power switching apparatus 10 has a switching means 50. The switching means 50 switches modes from an off mode (a mode capable of forming a complete two-wheel drive state in which the rear wheels are only driven) to an on mode (a mode capable of forming a complete four-wheel drive state in which the front and rear wheels are driven). In the off mode, the drive member 15 and both of the driven member 21 and 22 are placed in a disengaged state by the energizing members 45 and 46 mentioned above so as to be capable of racing. Power transmission from the drive member 15 to both of the driven members 21 and 22 can thus be cancelled. In the on mode, the drive member 15 and both of the driven members 21 and 22 are engaged, and the power transmission from the drive member 15 to both of the driven members 21 and 22 can be executed.

Figure 4:
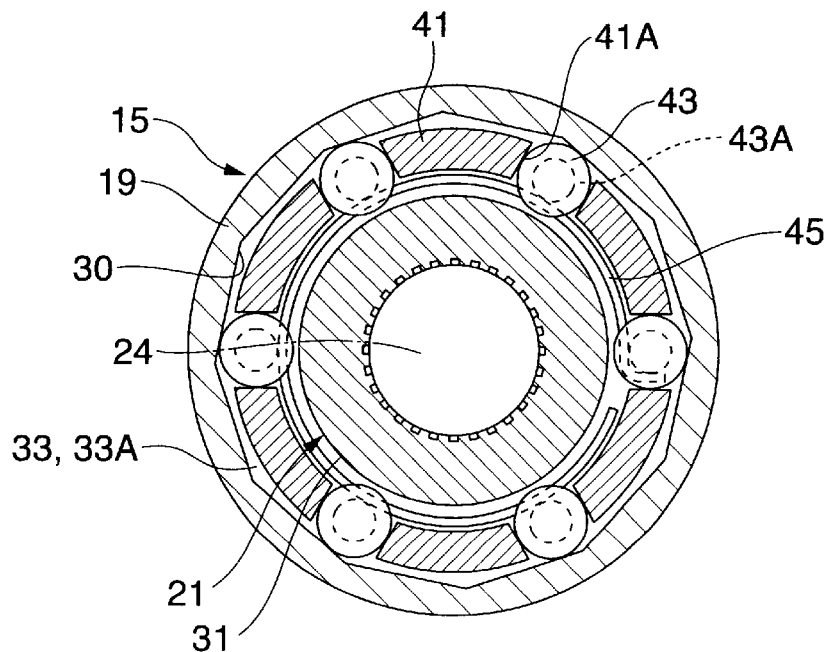
FIG. 4 is a cross sectional view along a line III—III in FIG. 2, and shows a wedge connection state.
Figure 5:
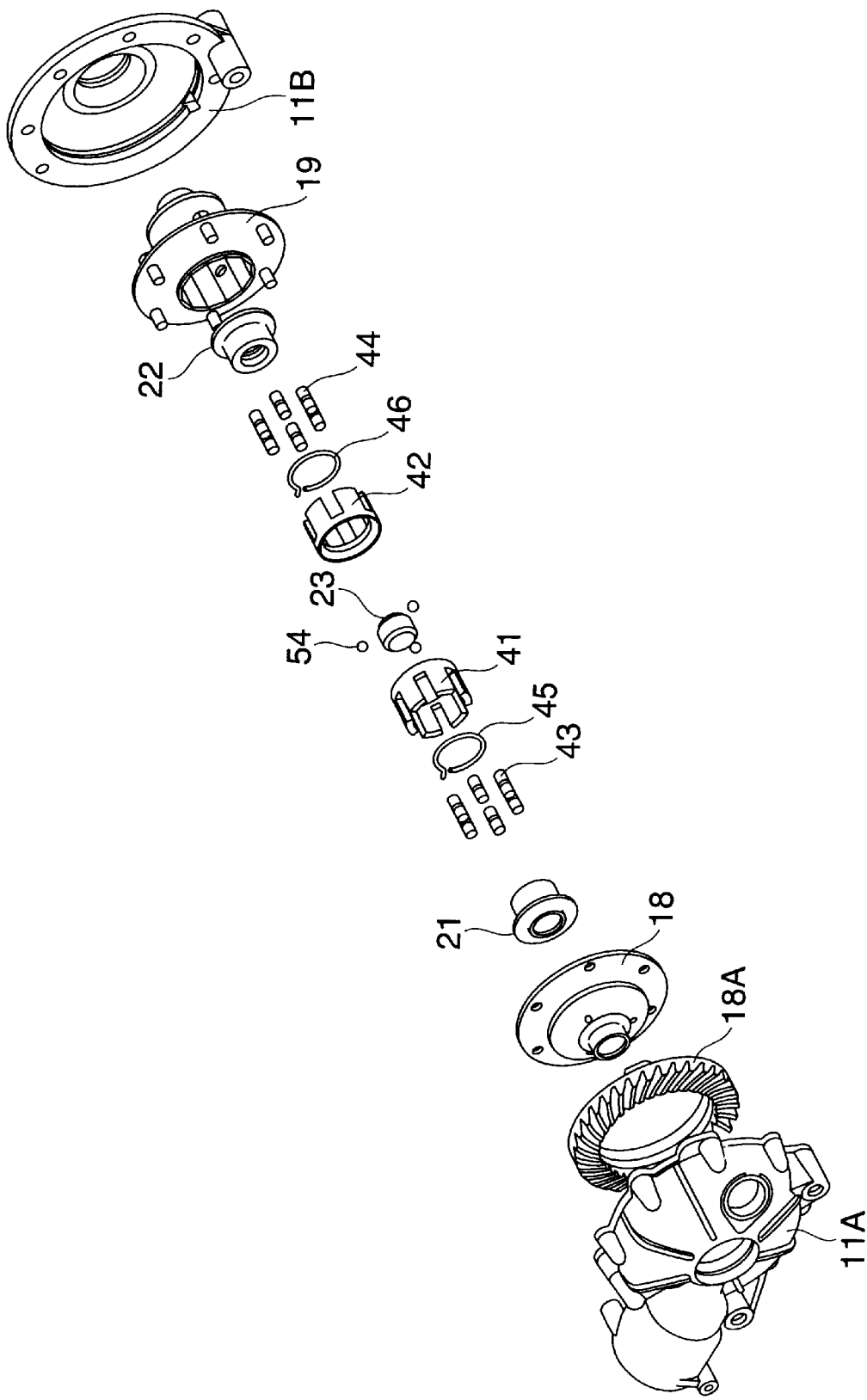
FIG. 5 is an exploded perspective view of the power switching apparatus.
Figure 6:
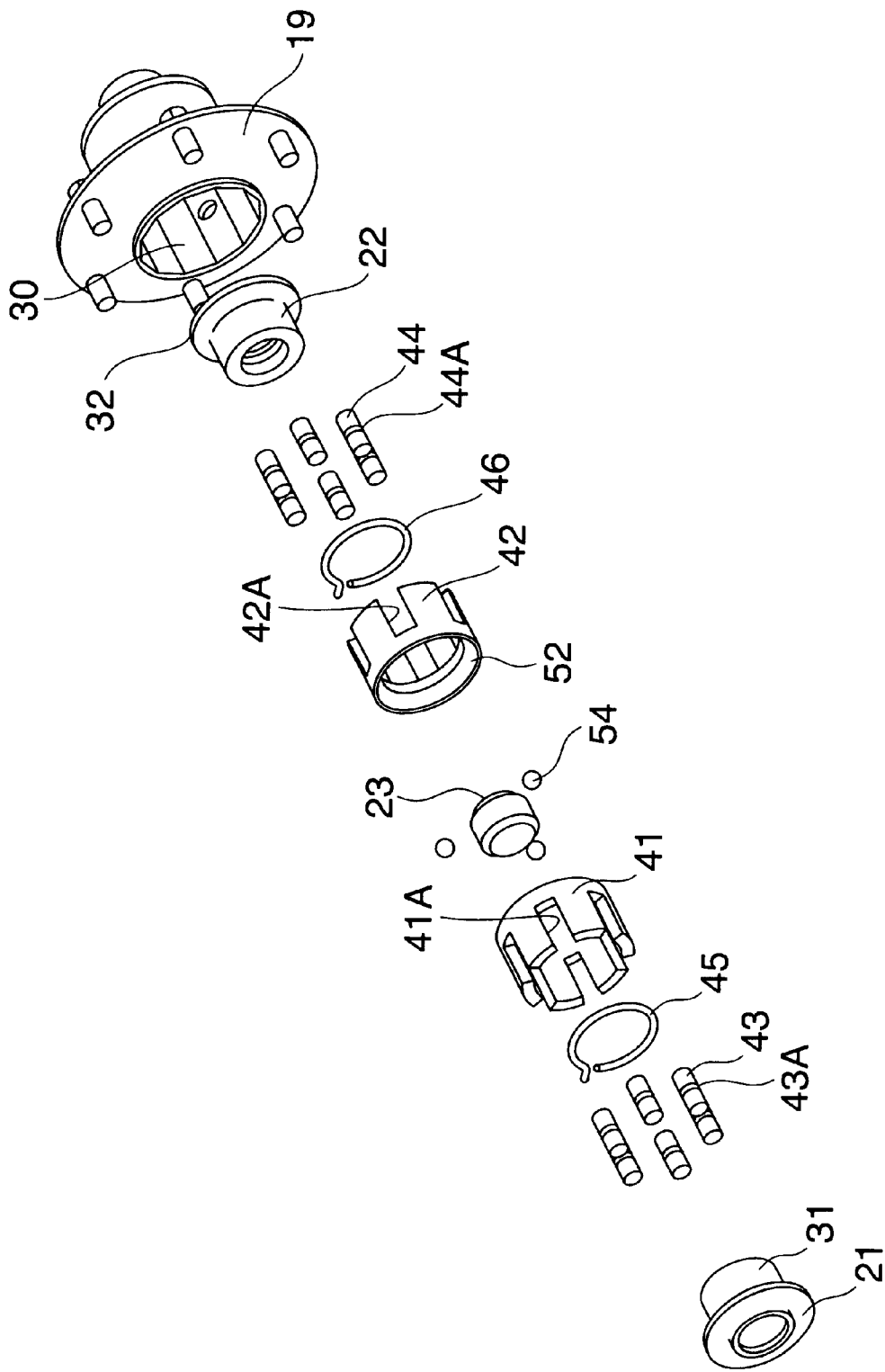
FIG. 6 is an enlarged view of a main portion in FIG. 5.

The switching means 50 can move the cages 41 and 42 slightly in an axial direction with respect to flanges 21C and 22C of both of the driven members 21 and 22, in a state of the followings; the inner end surfaces of both of the cages 41 and 42 are placed back to back with each other; inner peripheral portions 41B and 42B of the inner end surface of both of the cages 41 and 42 are supported by an outer peripheral guide surface 23C of the spacer 23, when receiving both of the cages 41 and 42 in the annular gap 33 between the drive member 15 and both of the driven members 21 and 22. In the on mode, the switching means 50 slides and guides both of the cages 41 and 42 by the guide surface 23C of the spacer 23 so as to move them to an outer side in an axial direction. This also brings the outer end surfaces of the respective cages 41 and 42 into contact with the opposing flanges 21C and 22C of the driven members 21 and 22 so as to achieve friction contact. Then, the switching means 50 makes the respective cages 41 and 42 capable of rotating together with the respective driven members 21 and 22. In this state, when the drive member 15 is rotated forward and a rotation phase difference is further generated between the drive member 15 and the driven members 21 and 22, the rolling elements 43 and 44 of the respective cages 41 and 42 move relatively in a positive direction in a peripheral direction of the circumferential connection surface 30 in the case 19. They wedge connect the circumferential connection surface 30 of the case 19 to the circumferential connection surfaces 31 and 32 of both of the driven members 21 and 22, and integrally rotate the drive member 15 (the case 19) and the driven members 21 and 22 in a forward rotating direction (FIG. 4). On the other hand, when the drive member 15 is rotated backward and the rotation phase difference is generated between the drive member 15 and the driven members 21 and 22, the rolling elements 43 and 44 of the respective cages 41 and 42 move relatively in a reverse direction in the peripheral direction of the circumferential connection surface 30 in the case 19. They wedge connect the circumferential connection surface 30 of the case 19 to the circumferential connection surfaces 31 and 32 of both of the driven members 21 and 22, and integrally rotate the drive member 15 (the case 19) and the driven members 21 and 22 in a backward rotating direction.

Accordingly, the switching means 50 moves both of the cages 41 and 42 in the axial direction based on a centrifugal force generated in the on mode. In particular, recess-shaped ball receiving portions 51 and 52 are provided in an inner diameter side of inner end surfaces which are back on to each other in both of the cages 41 and 42. A ball 54 having a fixed weight is received in each of a plurality of positions in a peripheral direction of a ball receiving space 53 (for example 3 positions) formed by both of the ball receiving portions 51 and 52. Both of the ball receiving portions 51 and 52 are provided with inner side flat surfaces 51A and 52A which are orthogonal in the axial directions of the cages 41 and 42, and outer side ball abutment surfaces 51B and 52B which are angular in the axial directions of the cages 41 and 42. When making both of the cages 41 and 42 back on to each other, the opposing flat surfaces 51A and 52A have wider widths than a diameter of the ball 54. The opposing ball abutment surfaces 51B and 52B form a V groove against which the ball 54 can abut in an outer side in the diametrical directions of the cages 41 and 42. Both of the cages 41 and 42 form a plurality of hole-like ball receiving spaces 53 which are separated in the peripheral direction at uniform intervals, in place of a circular ring-like ball receiving space 53 which is continuous in the peripheral direction. The ball 54 is provided and charged in each of the hole-like ball receiving spaces 53.

Accordingly, the power switching apparatus 50 is switched to the on mode when the drive member 15 (the case 19) reaches a high rotation which is over a predetermined fixed value, from the off mode in which the energizing members 45 and 46 mentioned above energize and hold the respective rolling elements 43 and 44 at the neutral position at which the rolling elements 43 and 44 are brought into contact with the maximum inner diameter portion of the circumferential connection surface 30 of the case 19. In the on mode, a predetermined level or more centrifugal force is applied to the ball 54. As a result of this centrifugal force, the ball 54 which is displaced outward in the diametrical directions of the cages 41 and 42 pushes and opens both of the cages 41 and 42 via the abutment with the ball abutment surfaces 51B and 52B which form the ball receiving space 53 in both of the cages 41 and 42. Both of the cages 41 and 42 are respectively slid and guided by the guide surface 23C of the spacer 23 so as to be moved in an outer side in the axial direction, whereby the outer end surfaces of the cages 41 and 42 can be respectively pressed against the flanges 21C and 22C of the driven members 21 and 22.

Accordingly, the power switching apparatus 10 operates in the following manner.

(A) Complete Two-Wheel Drive State

In a state in which drive member 15 is at a lower rotation than the predetermined fixed value, the switching means 50 is in the off mode. In the off mode of the switching means 50, when the wedge-connection between the drive member 15 and the left and right driven members 21 and 22 is cancelled, the driving force to the left and right driven members 21 and 22 is not transmitted, and a complete two-wheel drive state is achieved. The racing in the bevel gear or the like of the differential does not take place, and fuel consumption is improved.

(B) Complete Four-Wheel Drive State

When the drive member 15 reaches a high rotation which is over the predetermined fixed value, the switching means 50 is switched into the on mode. In the on mode of the switching means 50, when a rotation phase difference is generated between the drive member 15 and the driven members 21 and 22 due to a further sudden acceleration of the engine rotating force or the like, the following occurs. The drive member 15 and the left and right driven members 21 and 22 are immediately wedge connected, driving force to the left and right driven members 21 and 22 is transmitted, and a complete four-wheel drive state is achieved. Since both of the left and right driven members 21 and 22 are wedge connected to the drive member 15, rotating forces transmitted to the left and right driven members 21 and 22 are uniform, and high speed straight traveling stability is improved.

Further, during a period of high rotation which is over the fixed value, since the connection state is maintained even during engine braking or during sudden speed reduction, straight traveling stability is maintained.

According to the present embodiment, the following effects can be obtained.

(1) Since the power switching apparatus 10 has no differential gear built-in, it is possible to make the structure compact and simple, and to reduce weight.

(2) The switching means 50 moves the cages 41 and 42 in the axial direction due to the centrifugal force, and brings the end surfaces of the cages 41 and 42 into frictional contact with the flanges 21C and 22C of the driven members 21 and 22 so as to rotate together therewith. The drive member 15 and the left and right driven members 21 and 22 can be wedge connected to each other according to an interposition of the rolling elements 43 and 44 immediately after the rotation phase difference is generated between the driven members 21 and 22 and the drive member 15 (a roller clutch mechanism). The wedge connection between the drive member 15 and the driven members 21 and 22 can be easily and lightly engaged and disengaged.

(3) Since the switching means 50 is structured to start moving the cages 41 and 42 in the axial direction based on the centrifugal force which is generated at the predetermined rotation number of the drive member 15, it is possible to automatically switch into a complete four-wheel drive state at the predetermined rotation level. Also, it is possible to automatically secure high speed straight traveling stability.

(4) The switching means 50 can simply and securely move the cages 41 and 42 in the axial direction based on the simple structure (the ball cam mechanism) abutting the ball 54 to which the centrifugal force is applied against the ball abutment surfaces 51B and 52B which are provided in the cages 41 and 42.

As heretofore explained, embodiments of the present invention have been described in detail with reference to the drawings. However, the specific configurations of the present invention are not limited to the embodiments but those having a modification of the design within the range of the present invention are also included in the present invention. For example, the structure may be made such that the circumferential connection surface of the drive member and each of the circumferential connections of both of the driven members are wedge connected according to an interposition of the rolling elements. This may be caused by the followings; the rolling elements in each of the cages would be held in contact with the polygonal circumferential connection surface of the driven member by the energizing member so as to energize in a direction in which the rolling elements is not in contact with the circumferential connection surface of the drive member; and the end surface of the cage moved in the axial direction as a result of the centrifugal force at the switching time, would be brought into frictional contact with the drive member so as to rotate together therewith. Further, one cage may be commonly used.

As described above, according to the present invention, it is possible to easily switch between a complete two-wheel drive state and a complete four-wheel drive state, based on a compact and simple structure.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A power switching apparatus for switching a power transmitting state from a drive member to two right and left driven members, comprising:

a circumferential connection surface provided in a drive member, and circumferential connection surfaces provided in both of the driven members, the circumferential connection surface of the drive member and the circumferential connection surfaces of the driven members being coaxially arranged inside and outside;

an annular space which forms a wedge-like gap in a peripheral direction between the circumferential connection surface of the drive member and the circumferential connection surfaces of both of the driven members in a repeated manner;

a cage which is received in the annular space;

a plurality of rolling elements which are held at a plurality of positions in a peripheral direction of the cage;

an energizing member which brings each of the rolling elements into contact with the circumferential connection surfaces in the drive means and one of the driven members, and energizes each of the rolling elements in a direction in which the rolling elements are not in contact with the circumferential connection surfaces in the drive member and another of the driven members; and a switching means which moves the cage in an axial direction due to a centrifugal force, brings an end surface of the cage into frictional contact with the drive member and another of the driven member so as to rotate together therewith, and wedge connects the circumferential connection surface of the drive member and each of the circumferential connection surfaces in both of the driven members according to an interposition of the rolling elements.

2. A power switching apparatus according to claim 1, wherein the switching means is provided with a ball abutment surface which is angular in the axial direction of the cage in an inner diameter of the cage, a ball which is abuttable against the ball abutment surface of the cage, and a cage movable in the axial direction based on a centrifugal force applied to the balls.

3. A power switching apparatus according to claim 2, wherein the switching means is provided with an inner side flat surface which is perpendicular to the axial direction of the cage, and an outer side ball abutment surface which is angular in the axial direction of the cage; and in a state in which two cages are back adjacent each other, the opposing flat surfaces are wider than a diameter of the ball, and the opposing ball abutment surfaces form a V groove in an outer side in a diametrical direction of the cage, wherein the ball is capable of abutting.

* * * * *